US012031831B2

(12) United States Patent
Hansen et al.

(10) Patent No.: US 12,031,831 B2
(45) Date of Patent: Jul. 9, 2024

(54) SYSTEMS AND METHODS FOR RANKING ROUTES BASED ON DRIVING COMPLEXITY

(71) Applicant: Ford Global Technologies, LLC, Dearborn, MI (US)

(72) Inventors: Cheri Lyn Hansen, Canton, MI (US); Jonathan Diedrich, Carleton, MI (US); Dhivya Srinivasan, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 17/659,727

(22) Filed: Apr. 19, 2022

(65) Prior Publication Data

US 2023/0332900 A1    Oct. 19, 2023

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3492* (2013.01); *G01C 21/3605* (2013.01)

(58) Field of Classification Search
CPC ............ G01C 21/3415; G01C 21/3492; G01C 21/3605; G01C 21/3484
See application file for complete search history.

(56) References Cited

U.S. PATENT DOCUMENTS

| 8,738,285 | B2* | 5/2014 | Scofield | G01C 21/3492 |
| | | | | 701/425 |
| 9,506,769 | B2* | 11/2016 | Healey | G01C 21/3484 |
| 10,278,634 | B2 | 5/2019 | Cogill et al. | |
| 11,092,453 | B2 | 8/2021 | Upadhyay et al. | |
| 2011/0224898 | A1* | 9/2011 | Scofield | G08G 1/0104 |
| | | | | 701/532 |
| 2012/0191343 | A1* | 7/2012 | Haleem | G08G 1/0969 |
| | | | | 701/431 |
| 2014/0309914 | A1 | 10/2014 | Scofield et al. | |
| 2017/0115124 | A1 | 4/2017 | Mullen | |

(Continued)

OTHER PUBLICATIONS

Hussein Dia, An agent-based approach to modelling driver route choice behavior under the influence of real-time Informaiton, Transportation Reserach Part C, 10, (2002), 331-349.

(Continued)

*Primary Examiner* — David Faber
(74) *Attorney, Agent, or Firm* — Emily Drake; Eversheds Sutherland (US) LLP

(57) ABSTRACT

Systems and methods for ranking routes based on driving complexity are provided. The systems and methods may generate routes for a user based on factors indicative of difficulty levels of the routes (for example, based on the types of road features that exist on the route, among various other factors). The difficulty levels of the generated routes may then be used to automatically select, by a navigation system of a vehicle, a route that is suitable for the user based on their driving experience level. Alternatively, the routes may be presented to the user via the vehicle or a mobile device for selection by the user. The systems and methods may also be dynamic in that the difficulty levels of the routes may be adjusted as the user gains more driving experience.

20 Claims, 6 Drawing Sheets

(56) References Cited

U.S. PATENT DOCUMENTS

| | | | |
|---|---|---|---|
| 2017/0221169 A1* | 8/2017 | Champa | G01C 21/343 |
| 2018/0094943 A1* | 4/2018 | Grochocki, Jr. | G01C 21/3492 |
| 2018/0299284 A1* | 10/2018 | Wang | G08G 1/0112 |
| 2019/0346276 A1* | 11/2019 | Jackson | G01C 21/3484 |
| 2020/0056897 A1* | 2/2020 | Williamson | G01C 21/3602 |
| 2020/0284601 A1* | 9/2020 | Myers | G06F 16/2379 |
| 2022/0089177 A1* | 3/2022 | Wang | B60W 60/001 |
| 2022/0276063 A1* | 9/2022 | Berman | G01C 21/3484 |
| 2022/0324461 A1* | 10/2022 | Kuehnle | B60W 40/02 |
| 2022/0357172 A1* | 11/2022 | Lang | G01C 21/3484 |

OTHER PUBLICATIONS

Madlen Ringhand et al., Effect of complex traffic situations on route choice behavior and driver stress in residential areas, Transportation Research Part F, 60, (2019), Oct. 21, 2018, 274-287.

\* cited by examiner

SYSTEMS AND METHODS FOR RANKING ROUTES BASED ON DRIVING COMPLEXITY

BACKGROUND

As inexperienced drivers begin learning how to drive, the process of gaining comfort on the roads may be slow. Beginner drivers may feel intimidated by the complexity of certain routes based on vehicle speed, a number of sharp turns with oncoming traffic, etc. The difficulty level of the route chosen may significantly impact the comfort level of the driver along the route. There does not exist a system that is capable of informing a driver what to expect in terms of route complexity when they drive from their origin to their destination, and assisting the driver in gradually moving from easier to more difficult routes to help the driver become more comfortable with driving.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
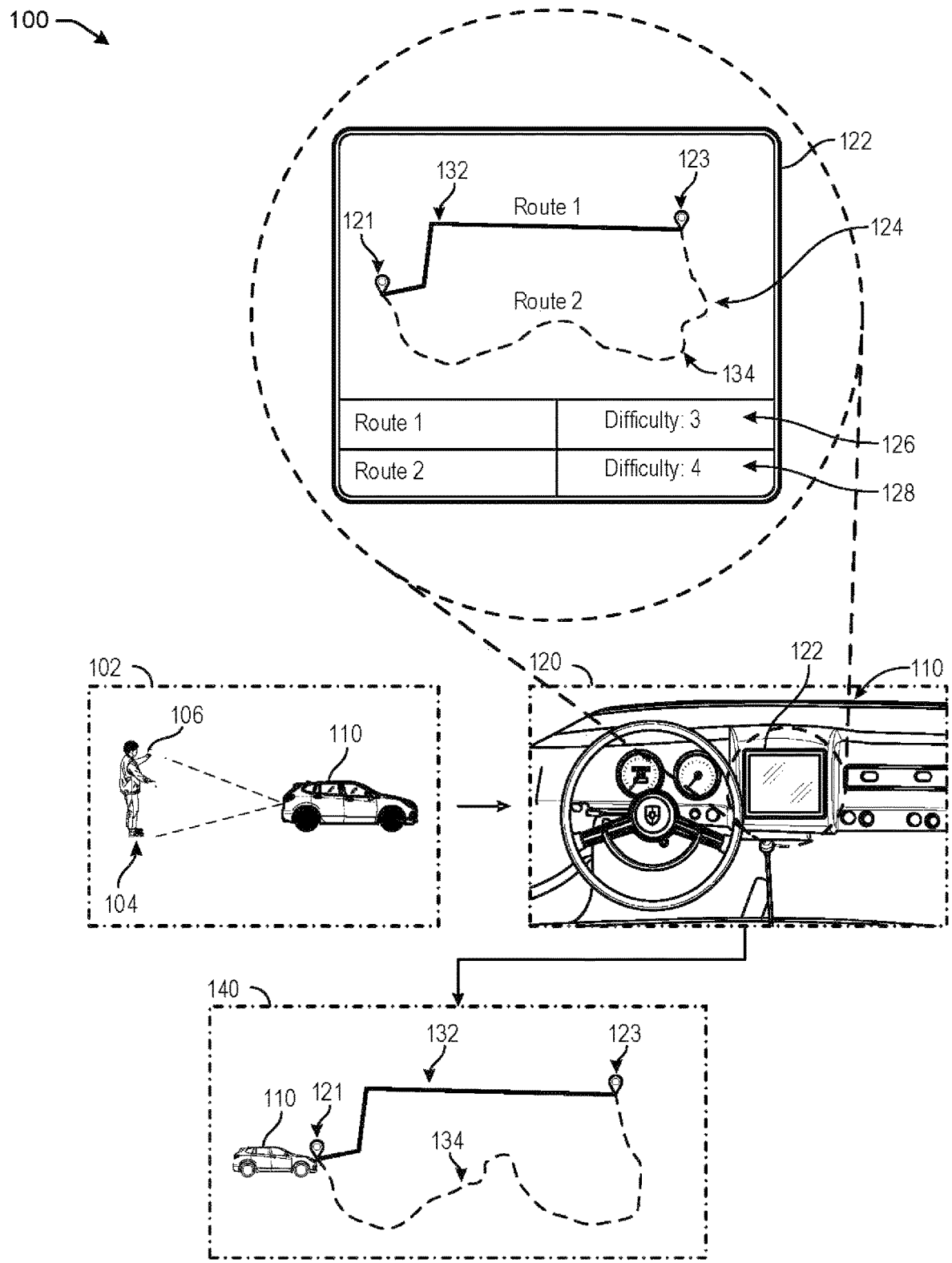
FIG. 1 illustrates an example use case, in accordance with one or more embodiments of the disclosure.

This disclosure relates to, among other things, systems and methods for ranking routes based on driving complexity. When a driver (the terms "driver" and "user" may be used interchangeably herein) enters a destination in a navigation system (for example, a navigation system included within a vehicle or a mobile device application), the route that is generated may oftentimes be decided based on factors such as an estimated travel time and/or a preference to avoid highways or toll routes. The navigation system might also take into account traffic conditions while determining the optimal route. However, as young adults or low-confidence drivers start planning drives there are several road conditions that might erode their confidence or challenge their driving ability level that may deter them from taking these more optimal routes. A first example may include high vehicle speeds needed to drive on highways and expressways. A second example may include challenging intersections that involve turning while managing oncoming traffic. A third example may include roundabouts or traffic circles. A fourth example may include highway sections with multiple highway merges. A fifth example may include highway sections with a high frequency of lane merges. A sixth example may include tunnels or bridges. A seventh example may include windy roads in icy conditions. An eighth example may include intersections with additional exit points. A ninth example may include highly unimproved roads. A tenth example may include roads with high crash statistics. These are merely examples of such road conditions, and any other types of conditions may also be applicable.

The systems and methods described herein may provide such drivers with route choices that include the difficulty level of the route (for example, based on the types of road features that exist on the route, among various other factors). The system may also provide alternate routes to the destination categorized by the known difficulty levels. This may allow the inexperienced driver to select a route that may be less optimal route in terms of distance or time, but is a less difficult route that the driver would be more comfortable traversing. In some cases, automatic route selection and/or navigation may also be performed based on route difficulty, rather than simply providing a list of options to a driver. That is, the system may automatically select a route that balances distance and time considerations as well as driver experience level and comfort.

In one or more embodiments, once difficulty determinations are made with respect to any potential routes between an indicated or determined starting location and ending location, a number of different actions may be taken. A first example action may include presenting a listing of potential routes to the user (for example, on a navigation system displayed through the vehicle's HMI or through a mobile device application of the user). The user may then select from the listing of routes. A second example action may include automatically selecting a route for the user based on the determined route difficulty levels and the experience level of the user. For example, if the user is a relatively new driver, and three potential routes are identified between the starting location and ending location (one with a low difficulty, one with a moderate difficulty, and one with a high difficulty), then the navigation system may automatically initiate navigation of the potential route with the low difficulty. As the user gains additional experience (for example, increased amount of time on the road, sensor data indicating improved driving performance, manual feedback from the user indicating increased comfort, etc.), then the system may instead select a more difficult route. This may be desirable if the more difficult route has certain advantages (for example, a shorter route), but may be a route that an inexperienced user may not be comfortable navigating. For example, a route using a highway with a toll may be the fastest route to the destination location, but the inexperienced user may be uncomfortable driving on such a road. The vehicle navigation system may initially select a route using back roads as the user gains additional experience.

Additionally, in one or more embodiments, the systems and methods may be implemented in vehicles with semi-autonomous or autonomous capabilities. That is, a vehicle may automatically identify a route and begin navigation. Selecting a low difficulty route may still be beneficial for a less experienced driver even if the vehicle has such capabilities. For example, if the vehicle only has semi-autonomous capabilities, then the user may be required to take manual intervention at certain points throughout a route. Selecting and automatically navigating a less difficult route may provide a more comfortable experience for the user. The same may apply for an autonomous vehicle in which the user may sometimes desire to take manual control of the vehicle. The route selection may even be beneficial if the autonomous vehicle maintains autonomous navigation throughout the entire route to provide the user more comfort that the vehicle may be capable of navigating the route effectively.

Figure 3:
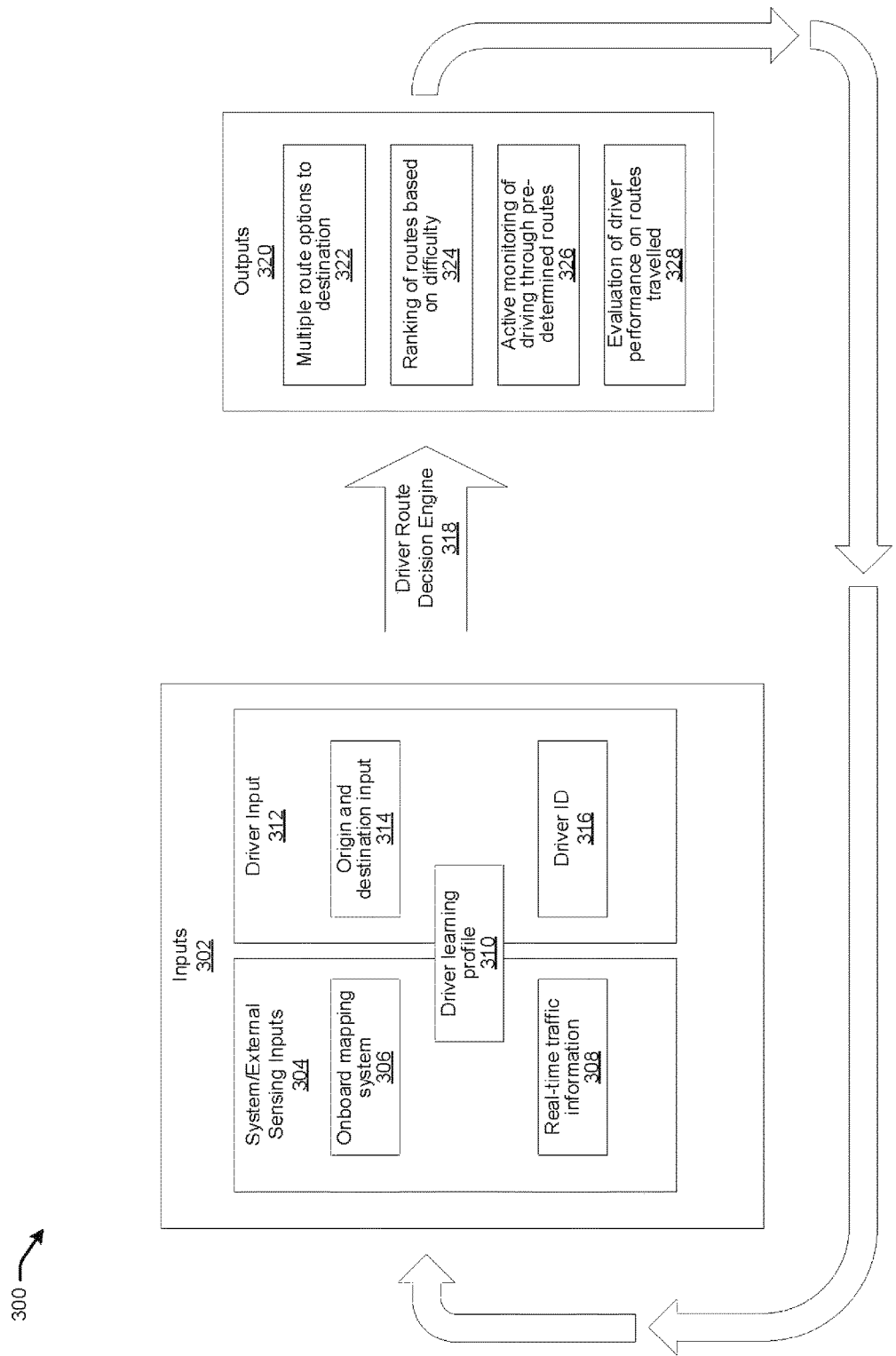
FIG. 3 illustrates an example flow diagram, in accordance with one or more embodiments of the disclosure.

In one or more embodiments, difficulty determinations may either be driver-independent or may be driver-specific. That is, the difficulty determinations may, in some cases, take into account certain objective factors, such as a number of lanes, average rate of speed of vehicles, a number of sharp turns, changes in elevation, and/or any other types of factors that may add difficulty to a particular route. Given this, the difficulty values tied to given routes may be the same regardless of the user. However, in some cases, the difficulty determinations values may be specific to the particular driver. That is, certain drivers may find different types of road conditions more difficult than other drivers. For example, a first driver may feel less comfortable driving on a highway than a second driver, but the first driver may feel more comfortable driving in snow than the second driver. These driver preferences may be stored to a driver learning profile (for example, as illustrated in FIG. 3) that may be stored on a device associated with the driver, on the vehicle, on a remote server, etc. Thus, a highway route may be presented as a more difficult route for the first driver than the second driver, but a route including roads with snow may be presented as a more difficult route for the second driver compared to the first driver.

Additionally, difficulty determinations may continuously evolve. That is, as a driver obtains more experience, certain road conditions may no longer present as high of a degree of difficulty to the driver as they may have in the past. In such cases, the difficulty level ties to roads including such conditions may be reduced over time. Alternatively, the difficulty level may remain the same, but the more difficult route options may be automatically selected by the navigation system (or manually selected by the user) as the driver's experience level with the road condition increases. Changes in the driver experience level may be determined based on different types of information, such as sensor data collected as the user traverses a full route or a specific road condition, an amount of time that the driver has been driving, manual feedback from the driver input into the system, and/or any other types of information. This constant evolution of the route difficulty system may be effectuated using, for example, a machine learning model (or the like). Such a model may be illustrated further with respect to FIG. 3.

In one or more embodiments, the determinations and the constant evolution of the determinations may be facilitated using an artificial intelligence model, a machine learning model, or the like. There are multiple factors that can influence such a route difficulty model. For example, such factors may include road features present in a given route (e.g., roundabouts, bridges, highways, etc.). Such factors may also include a time of day. Such factors may also include weather conditions along the route. Such factors may also include manual inputs provided by the user (e.g., some users may not feel comfortable crossing bridges). Such factors may also include a number of passengers (could also include metadata like age). Such factors may also include traffic information. These factors are not intended to be limiting in any way and any other factors may also be applicable. These factors may be used to develop a model that generates a difficulty level.

In one or more embodiments, the artificial intelligence model, a machine learning model, or the like may be constantly updated during and/or after a user completes various routes. For example, a user may select a particular route associated with various factors. During and after traversing the route, the user may provide feedback such as a level of comfort experienced during the route, particular aspects of the route that the user found difficult to navigate, etc. This data may then be provided as inputs to the artificial intelligence model, a machine learning model, or the like to adjust the model. The model may also be adjusted based on any other types of data, such as vehicle data obtained during the navigation of the route. Non-limiting examples of such data may include driving behavior, such as a number of times a brake pedal is depressed, an average acceleration, etc. The data may also include data obtained from the user, such as biometric data indicative of stress levels, etc.

In one or more embodiments, the systems and methods described herein may provide a number of benefits. A first example benefits may involve creating routes based on difficulty of road characteristics. A second example benefits may involve classifying different road occurrences based on the difficulty maneuvering them. A third example benefits may involve providing beginner drivers an opportunity to escalate their training based on their skill/confidence level. A fourth example benefits may involve gauging road difficulty based on weather, visibility conditions, etc.

Turning to the figures, FIG. 1 illustrates an example use case 100, in accordance with one or more embodiments of the disclosure.

In one or more embodiments, the use case 100 illustrates an example implementation of the systems and methods described herein. The use case 100 begins with scene 102. Scene 102 depicts a user 104 associated with a mobile device 106 (for example, a smart phone, tablet, laptop, and/or any other type of device). The user 104 may be in the vicinity of a vehicle 110. The vehicle 110 may determine the identity of the user 104 through any number of suitable methods. For example, the vehicle 100 may be equipped with one or more camera that may be configured to capture images and/or videos of the user 104 such that the vehicle may identify the user 104 through computer vision techniques. The vehicle 110 may also have a biometrics system that the user 104 may interact with to provide their identity to the vehicle 110. The vehicle 110 may also be in communication with the mobile device 106 of the user 104, a key fob (not shown in the figure), and/or any other type of device. These types of device may store information about the user 104 (such as a driver profile, for example), which may be communicated to the vehicle 110. The vehicle 110 may also ascertain the identity of the user 104 through any other suitable method as well.

In one or more embodiments, scene 120 shows the interior of the vehicle 110, which includes a human machine interface (HMI) 122, which may be a display screen within the vehicle 110. Once the user 104 is identified and enters the vehicle 110, the user may indicate a destination location 123 through the HMI 122. The user 104 may similarly indicate the destination location 123 through the mobile device 106. In some cases, the destination location 123 may automatically be determined without requiring any manual input from the user 104. For example, using historical data is may be determined that the user 104 typically commutes to work at 8 am, and the user 104 has currently entered the vehicle at 7:50 am. Given this, it is likely that the intended destination location 123 of the user 104 may be the user's workplace. The starting location 121 of the vehicle 110 may also be determined as the current location of the vehicle (which may be determined using GPS or any other suitable positioning techniques).

Once the starting location 121 and destination location 123 are known, the system may then determine one or more potential routes (for example, a first route 132 and a second route 134) between the starting location 121 and the destination location 123. Additionally, a difficulty score may also be assigned to each potential route. Additional details about how the difficulty determinations are made are described with respect to the flow diagram 300 of FIG. 3. For example, the first route 132 may be assigned a difficulty score of "3" and the second route 134 may be assigned a difficulty score of "4." However, these are just examples of difficulty score designations, and the route difficulties may be indicated in any other form as well (for example, text strings, etc.).

As shown in the figure, once the routes and difficulty scores are determined, this information may be presented to the user 104 (for example, through the HMI 122 of the vehicle 110 and/or the mobile device 106). The user may then select from the listing of routes. A second example action may include automatic selection of a route for the user based on the determined route difficulty levels and the experience level of the user. For example, if the user is a relatively new driver, and three potential routes are identified between the starting location and ending location (one with a low difficulty, one with a moderate difficulty, and one with a high difficulty), then the navigation system may automatically initiate navigation of the potential route with the low difficulty. As the user gains additional experience (for example, increased amount of time on the road, sensor data indicating improved driving performance, manual feedback from the user indicating increased comfort, etc.), then the system may instead select a more difficult route. This may be desirable if the more difficult route has certain advantages (for example, a shorter route), but may be a route that an inexperienced user may not be comfortable navigating. For example, a route using a highway with a toll may be the fastest route to the destination location, but the inexperienced user may be uncomfortable driving on such a road. The vehicle navigation system may initially select a route using back roads as the user gains additional experience. Additionally, the selections may be performed based on more granular, user-specific considerations. For example, as aforementioned, some users may find certain types of road conditions more difficult than other users. Given this, two users of similar driving experience may still result in automatic selection of one route for a first user and one route for another user if the two users find different road conditions more difficult than others.

In one or more embodiments, scene 140 shows the vehicle 110 navigating from the starting location to the destination location 123 using the first route 132 instead of the second route 134. During traversal of the first route 132, data may be captured along the route, including data at any road conditions that may contribute to the difficulty of the route. This data may be used to adjust future difficulty determinations (for example).

Figure 2:
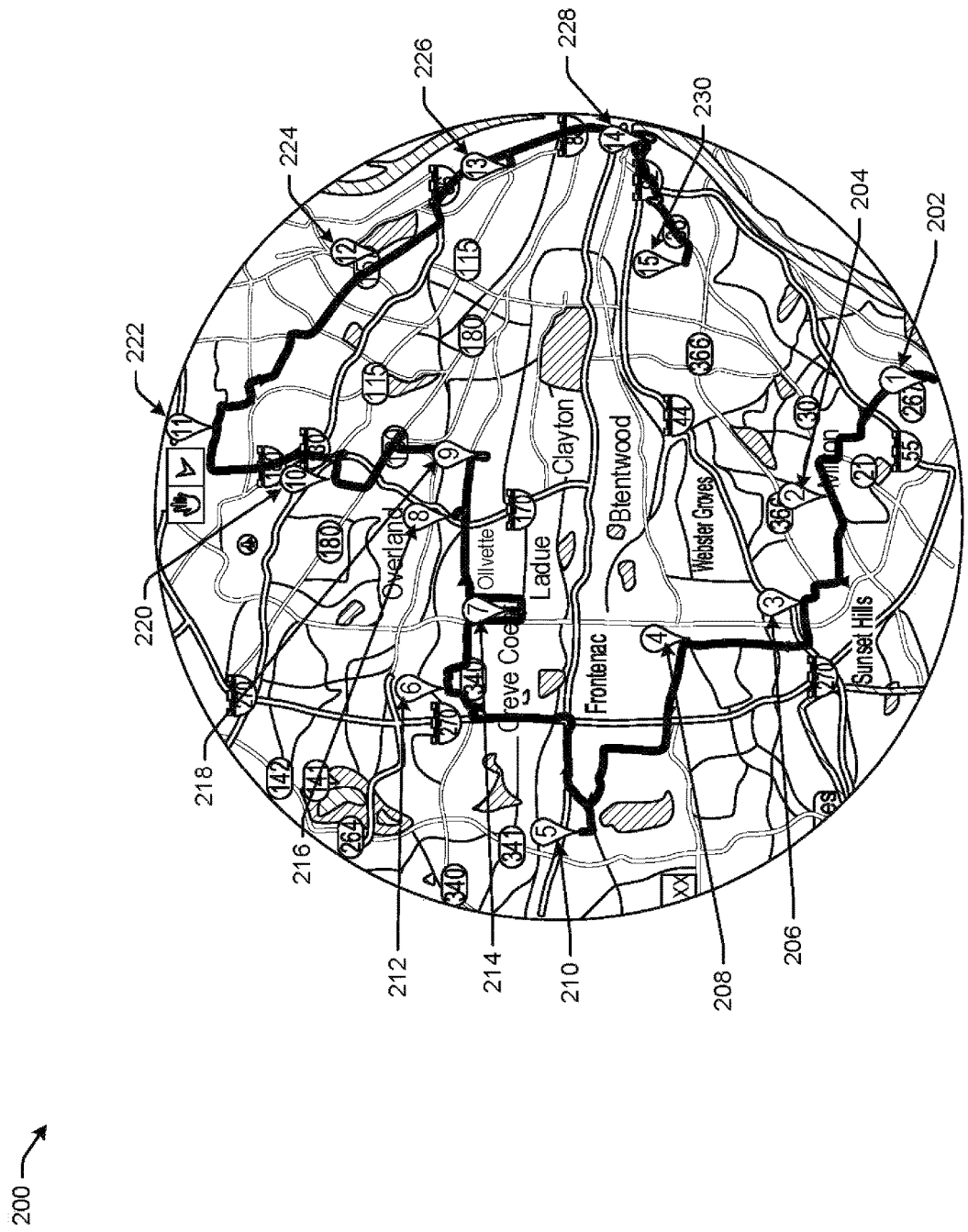
FIG. 2 illustrates an example user interface, in accordance with one or more embodiments of the disclosure.

FIG. 2 illustrates an example user interface 200, in accordance with one or more embodiments of the disclosure.

In one or more embodiments, the user interface 200 more particularly depicts an example of a presentation of a potential route to a user with more granular information about the route. For example, certain portions of the route may be associated with a marker (for example, markers 202-230), which may indicate a potential area of difficulty for a driver. In some cases, a user may be able to select one of the markers to view additional information about the difficult portion of the route. For example, a difficulty level may also be assigned to that specific portion of the route, and/or a description of the difficulties associated with that portion of the route may be presented to the user.

FIG. 3 illustrates an example flow diagram 300, in accordance with one or more embodiments of the disclosure.

In one or more embodiments, the flow diagram 300 illustrates a sequence of operations associated with the systems and methods described herein. The flow diagram 300 begins with one or more inputs 302. These inputs may include at least system and/or external sensing inputs 304, driver inputs 312, and/or any other types of inputs as well. The system and/or external sensing inputs 304 may include at least mapping system inputs 306, real-time traffic information 308, a driver learning profile 310, and/or any other types of inputs. The driver inputs 312 may include at least origin and destination inputs 314, driver identification information 316, the driver learning profile 310, and/or any other types of inputs.

In one or more embodiments, the mapping system inputs 306 may include any relevant map information. For example, the map information may include information that may be provided by a navigation system of the vehicle, such as the locations of roads, types of roads (for example, number of lanes, one-way or roads with traffic moving in multiple directions, intersections, etc.), buildings, other vehicles, and/or any other types of information. The mapping system inputs 306 may also include information that may be used to determine the difficulty of particular route, such as speed limits of roads included along the route, a number of sharp turns with oncoming traffic, an elevation of roads included along the route, etc. In some cases, the mapping system inputs 306 may be specific to a current location of the user, a destination of the user, and/or any locations in between the current location and the destination location. However, the mapping system inputs 306 may include information associated with other locations as well. In some cases, these mapping system inputs 306 may be obtained from a local system (for example, map information may be stored locally on the vehicle navigation system). However, in some cases, the mapping system inputs 306 may also be obtained from a remote location (for example, one or more remote servers).

In one or more embodiments, the real-time traffic information 308 may include any relevant traffic information, such as a number of vehicles at particular locations, an estimated amount of time to traverse a particular road segment, the locations of any traffic collisions or any other condition that may stop the flow of traffic on a particular road segment, and/or any other relevant traffic information.

In one or more embodiments, the driver learning profile 310 may profile user-specific information. For example, the driver learning profile 310 may indicate route difficulty for a specific user that may be influenced by driver behavior beyond an initial baseline route difficulty. The driver learning profile 310, for example, may indicate types of routes selected by the user (for example, if the user always chooses moderate difficulty routes, the system may learn factors associated with moderate difficult routes and adjust offerings). The driver learning profile 310 may also indicate driver habits along route evaluated with respect to the various factors mentioned herein or otherwise. For example, speed, braking, lane centering ability, etc. For example, the vehicle may assess the speed and lane centering accuracy while driving on expressways. If the speeds are slow and the right lane is always utilized, then it may be determined that the driver's comfort level is not as high as another driver who maintains traffic speed and is able to effectively change lanes into passing lanes. Based on routes selected and the tracking of road features traversed the driver learning profile 310 may adjust for a specific user. As one non-limiting example, as more roundabouts are traversed the assumed difficulty level may be reduced.

In one or more embodiments, the origin and destination input 314 may include starting and destination locations provided by the driver. For example, the driver may indicate a location that they desire to travel towards in the vehicle, and may also indicate a starting location (which may be a current location of the driver and/or a location that is remote from the driver (for example, if the driver wishes to begin navigation at a future time when they may be located at a different location). In some cases, the starting and/or the destination locations may be automatically determined. For example, the starting location of the driver may be determined using a current GPS location of the driver and/or the vehicle and/or may be determined using any other suitable systems or methods. The destination location may also automatically be determined based on historical information associate with the driver. For example, if it is determined that the driver typically commutes to work at 7 am, then the system may automatically determine that the destination location may be the workplace of the driver around this time. However, the starting location and the destination location may also be manually provided by the driver. For example, the driver may input the starting and/or destination locations into a human machine interface (HMI) of the vehicle, a mobile device application, and/or through any other system and/or device.

In one or more embodiments, the driver identification information 316 may include any information that may be used to identify the driver of the vehicle. For example, the driver identification information 316 may include personal identifying information, such as a name of the driver, an age of the driver, and/or any other relevant information. In some cases, this information may be provided manually by the driver (for example, through a human machine interface (HMI) of the vehicle, a mobile device application, and/or any other suitable systems and/or methods). However, this information may also be obtained automatically in some cases as well. For example, the driver may be identified by the vehicle through communications between the vehicle and a device of the driver (for example, a key fob, mobile device, such as a smartphone, and/or any other device that may be capable of storing and/or accessing this information). That is, when the device is within a certain range of the vehicle, an indication of the driver may be provided to the vehicle. The automatic determination of the driver may also be performed using any other suitable systems and/or methods, such as computer vision (for example, a camera of the vehicle identifying the driver), biometrics, etc.

In one or more embodiments, the flow diagram 300 may provide any inputs 302 to a driver route decision engine 318. The driver route decision engine 318 may be a system that may analyze the one or more inputs 302 and may produce one or more outputs 320 based on the one or more inputs 302. The one or more outputs 320 may include at least route options 322, route rankings 324, route progression monitoring information 326, driver evaluation information 328, and/or any other types of outputs. In some cases, this processing may be performed locally at the vehicle and/or may be performed at a remote system, such as a remote server, on a mobile device application of the driver, or through any other type of system.

In one or more embodiments, the determinations and the constant evolution of the determinations associated with the driver route decision engine 318 may be facilitated using an artificial intelligence model, a machine learning model, or the like. There are multiple factors that can influence such a route difficulty model. For example, such factors may include road features present in a given route (e.g., roundabouts, bridges, highways, etc.). Such factors may also include a time of day. Such factors may also include weather conditions along the route. Such factors may also include manual inputs provided by the user (e.g., some users may not feel comfortable crossing bridges). Such factors may also include a number of passengers (could also include metadata like age). Such factors may also include traffic information. These factors are not intended to be limiting in any way and any other factors may also be applicable. These factors may be used to develop a model that generates a difficulty level.

In one or more embodiments, the artificial intelligence model, a machine learning model, or the like may be constantly updated during and/or after a user completes various routes. For example, a user may select a particular route associated with various factors. During and after traversing the route, the user may provide feedback such as a level of comfort experienced during the route, particular aspects of the route that the user found difficult to navigate, etc. This data may then be provided as inputs to the artificial intelligence model, a machine learning model, or the like to adjust the model. The model may also be adjusted based on any other types of data, such as vehicle data obtained during the navigation of the route. Non-limiting examples of such data may include driving behavior, such as a number of times a brake pedal is depressed, an average acceleration, etc. The data may also include data obtained from the user, such as biometric data indicative of stress levels, etc.

In one or more embodiments, the route options 322 may include a listing of potential route options that may be followed to traverse from the starting location to the destination location (for example, the starting location and destination located indicated in the driver inputs 312). For example, there may exist any number of potential routes that the vehicle may traverse in order to reach the destination location from the starting location. In some cases, the route options 322 may include all of the potential routing options. However, in some cases, the route options 322 may be filtered so that only a subset of all of the potential route options 322 are provided as outputs and/or presented to the driver. The manner in which the potential route options may be filtered may include any type of filter. For example, the route options 322 may be filtered based on an estimated time to the destination location using a particular route, an amount of traffic on the route, a difficultly of the route (for example, only routes falling below a difficulty threshold may be presented to inexperienced drivers), weather conditions along the route, and/or any other types of filters. Additionally, in some cases, the filters may be determined based on driver-specific information that may be obtained from the driver learning profile 310, the driver identification information 316, and/or any other source of information. For example, the driver-specific information may indicate that the driver is an inexperienced driver, and therefore routes falling below a difficulty threshold may be presented to the driver.

In one or more embodiments, the route rankings 324 may serve as indications of the difficulty of any potential routes between the starting location and the destination location as determined by the driver route decision engine 318. That is, the route rankings 324 may be used to convey to the user the relative difficulties of the various routes. The route rankings 324 may be provided in any form, such as numerical values, text strings, and/or any other form. In cases where the vehicle automatically makes navigation decisions without requiring a selection of a route by the user, the route rankings may also be used by the vehicle in a similar manner. For example, if the route rankings 324 are presented as numerical values with a lower value indicating a route of lower difficulty, then the vehicle may automatically select a route associated with the lowest numerical value.

In one or more embodiments, the route progression monitoring information 326 may be two-fold. First, the route progression monitoring information 326 may include real time updates based on changing conditions. For example, changes in traffic or weather may influence the route. As a second example, if temperatures drop dramatically, then bridges that may be icy may be avoided. Further, the output may be used to update the driver learning profile 310. As the driver encounters road features it is assumed comfort level may increase. The goal is that what was once a moderate difficulty will become easy with experience.

In one or more embodiments, the driver evaluation information 328 may involve an analysis relating to how the driver handles a route. An example method of such an analysis may include a measure of a speed along the route as compared to a nominal speed. Each difficulty level may create a nominal driving profile based on speed limits, weather, traffic, and historical driving data. Another example method of such an analysis may include braking habits along the route. Another example method of such an analysis may include advanced driver assistance system (ADAS) sensor input. As a first example, if the auto braking feature is enabled (warning or active braking). As a second example, lane centering information (how well the driver stays in the lane).

In one or more embodiments, the flow diagram 300 may also exist in the form of a feedback loop, such that the driver route decision engine 318 may evolve over time and the routing recommendations and/or automatic selections provided by the system may change over time depending on the outputs 320. For example, [provide more difficult routing options based on how well driver performs, may adjust which aspects are considered more difficult for the user, etc.].

Figure 4:
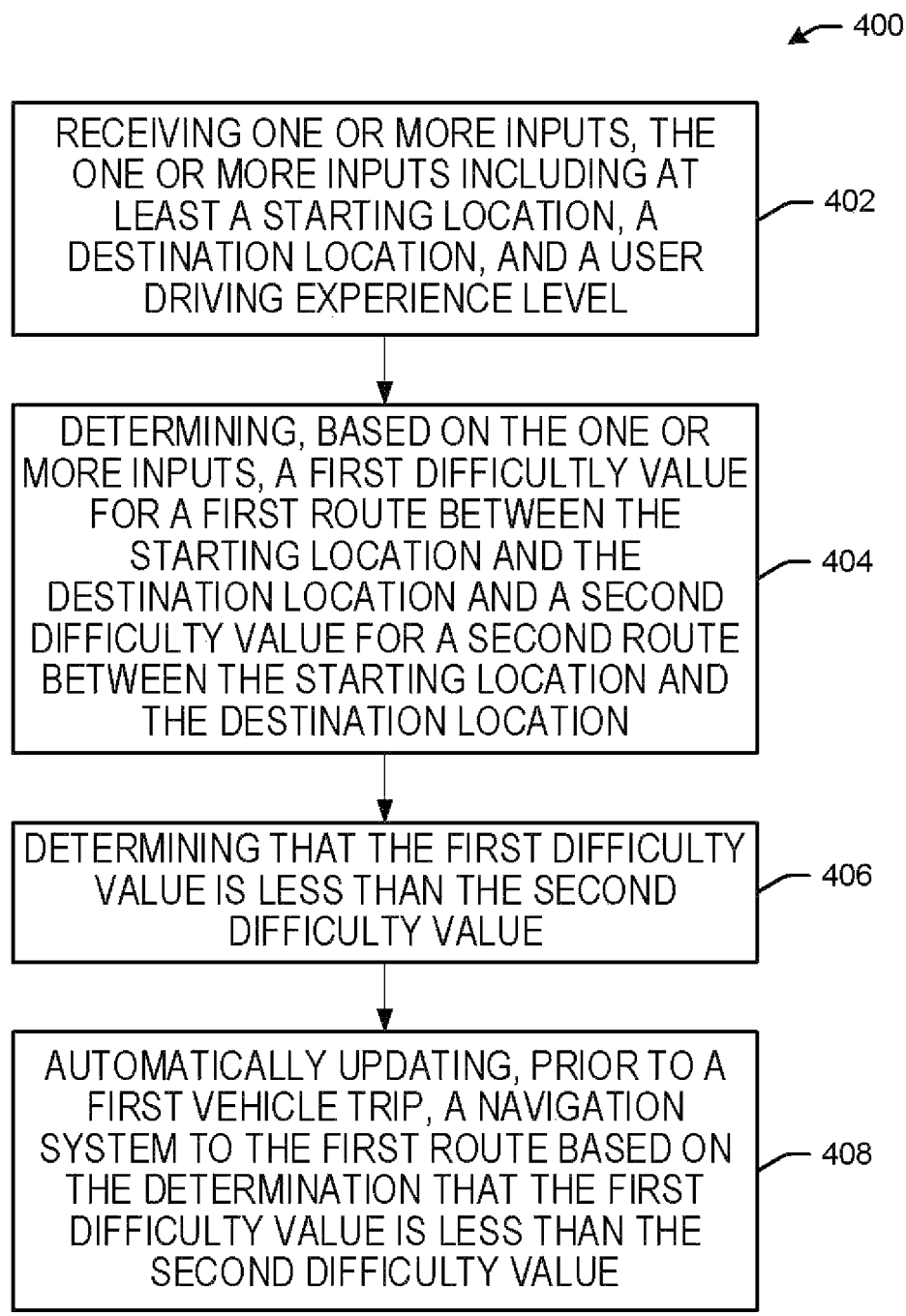
FIG. 4 illustrates an example method, in accordance with one or more embodiments of the disclosure.

FIG. 4 illustrates an example method 400, in accordance with one or more embodiments of this disclosure. At block 402, the method 400 may include receiving one or more inputs, the one or more inputs including at least a starting location, a destination location, and a user identification. Block 404 of the method 400 may include determining, based on the driver identification, a driving experience level. Block 406 of the method 400 may include determining, based on the one or more inputs and driver experience level, a first difficultly value for a first route between the starting location and the destination location and a second difficulty value for a second route between the starting location and the destination location. Block 408 of the method 400 may include determining that the first difficulty value is less than the second difficulty value. Block 410 of the method 400 may include automatically updating, prior to a first vehicle trip, a navigation system to the first route based on the determination that the first difficulty value is less than the second difficulty value.

In one or more embodiments, the method 400 may also include capturing, while the vehicle is navigating the first route in real-time, first data associated with navigation of the first route. The method may also include automatically updating, prior to a second vehicle trip that is subsequent to the first vehicle trip, the navigation system to the second route instead of the first route based on the first data and/or second data received from the user.

In one or more embodiments, automatically updating the navigation system to the first route prior to the first vehicle trip is performed based on a machine learning system, wherein the machine learning system is trained using the first data and the second data to generate an updated machine learning system, and wherein automatically updating the navigation system to the second route prior to the second vehicle trip is performed based on the updated machine learning system.

In one or more embodiments, the method 400 may also include presenting a listing including the first route, the second route, an indication of the first difficulty value, and an indication of the second difficulty value. The method 400 may also include receiving a selection of the first route.

In one or more embodiments, the one or more inputs further comprise map information from the navigation system, real-time traffic information, and/or driver identification information.

In one or more embodiments, the starting location, destination location, and/or user driving experience level are automatically determined based on historical data associated with the user.

In one or more embodiments, the starting location and destination location are received through a human-machine interface (HMI) of the vehicle or a mobile device application user interface, and wherein the first route is presented through the HMI or the mobile device application user interface.

Figure 5:
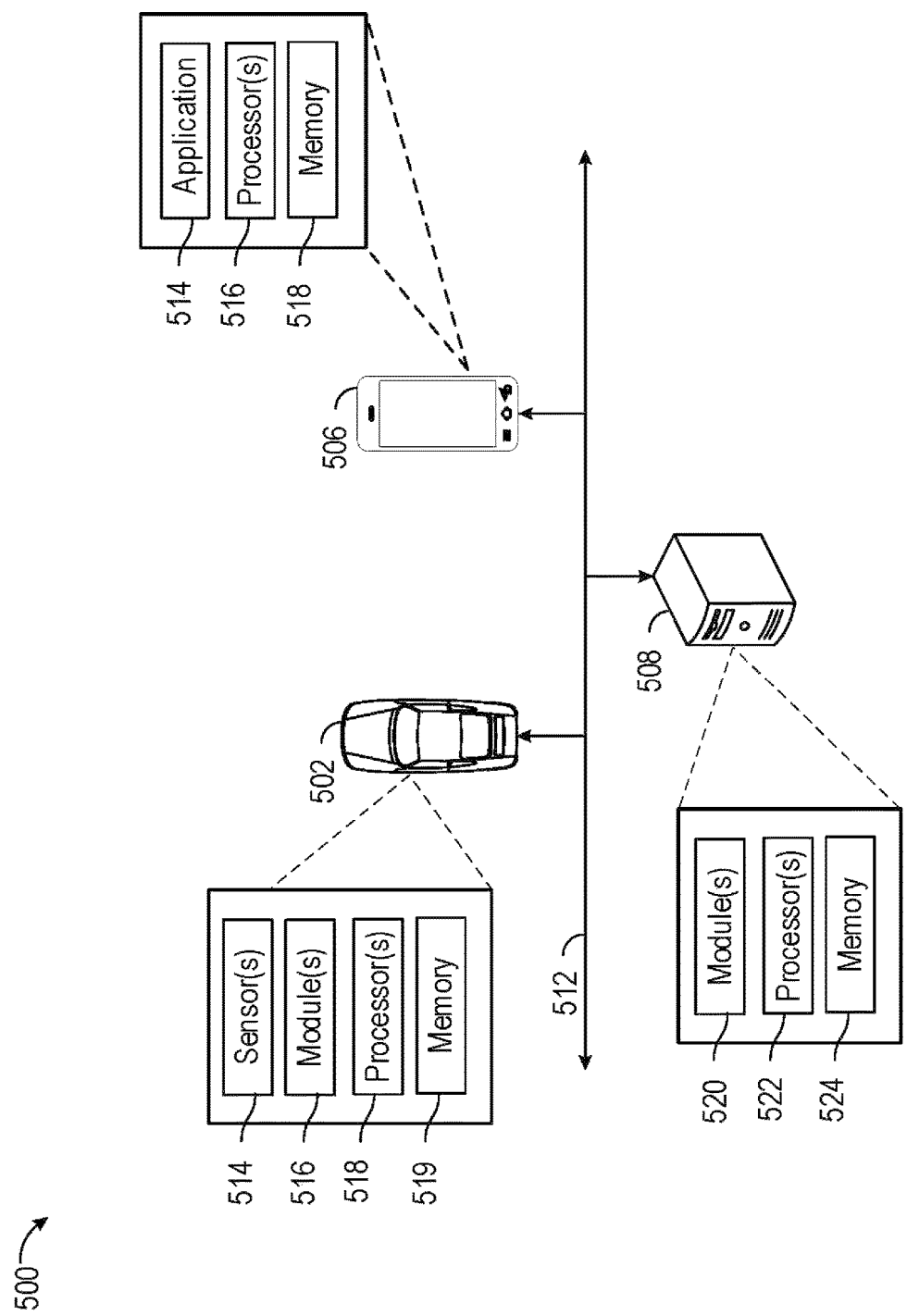
FIG. 5 illustrates an example of a system, in accordance with one or more embodiments of this disclosure.

FIG. 5 illustrates an example of a computing system 500, in accordance with one or more embodiments of this disclosure. In one or more embodiments, the system 500 may include at least one or more vehicles 502, one or more user devices 506, and/or one or more servers 508.

In one or more embodiments, a vehicle 502 may be a vehicle that may include any type of vehicle (for example, electric vehicle, hybrid vehicle, internal combustion engine vehicle, autonomous or semi-autonomous vehicle, etc.) a ground-penetrating tailgate sensor system as described herein. For example, the vehicle may include one or more sensors 514, such as cameras, radar, lidar, ultra-wideband, and/or any other types of sensors that may be capable of capturing data.

In one or more embodiments, the one or more user devices 506 may be devices that may be used by a user associated with a vehicle 502. A user device 506 may be used for a number of purposes, such as, for example, performing communications with the vehicle 502 to provide information about a user to the vehicle 502, presenting potential route options to a user (including route difficulty indications, providing navigation functions, and/or any other functions described herein. Additionally, the vehicle 502 may include a human-machine interface (HMI) that may allow the user to perform the same or similar functions.

In one or more embodiments, the one or more servers 508 may be remote servers that may perform any of the analyses described herein. Any of the operations described herein as being performed by the vehicle 502 or the user device 506 may also be performed by the remote server 508. For example, driver profile information may be provided to the remote server 508, the remote serve 508 may then make route difficulty determinations and/or automatic route selections, and then may provide this information back to the vehicle 502 and/or user device 506. However, any of these determinations may also be performed locally at the vehicle 502 and/or the user device 506 as well.

Figure 6:
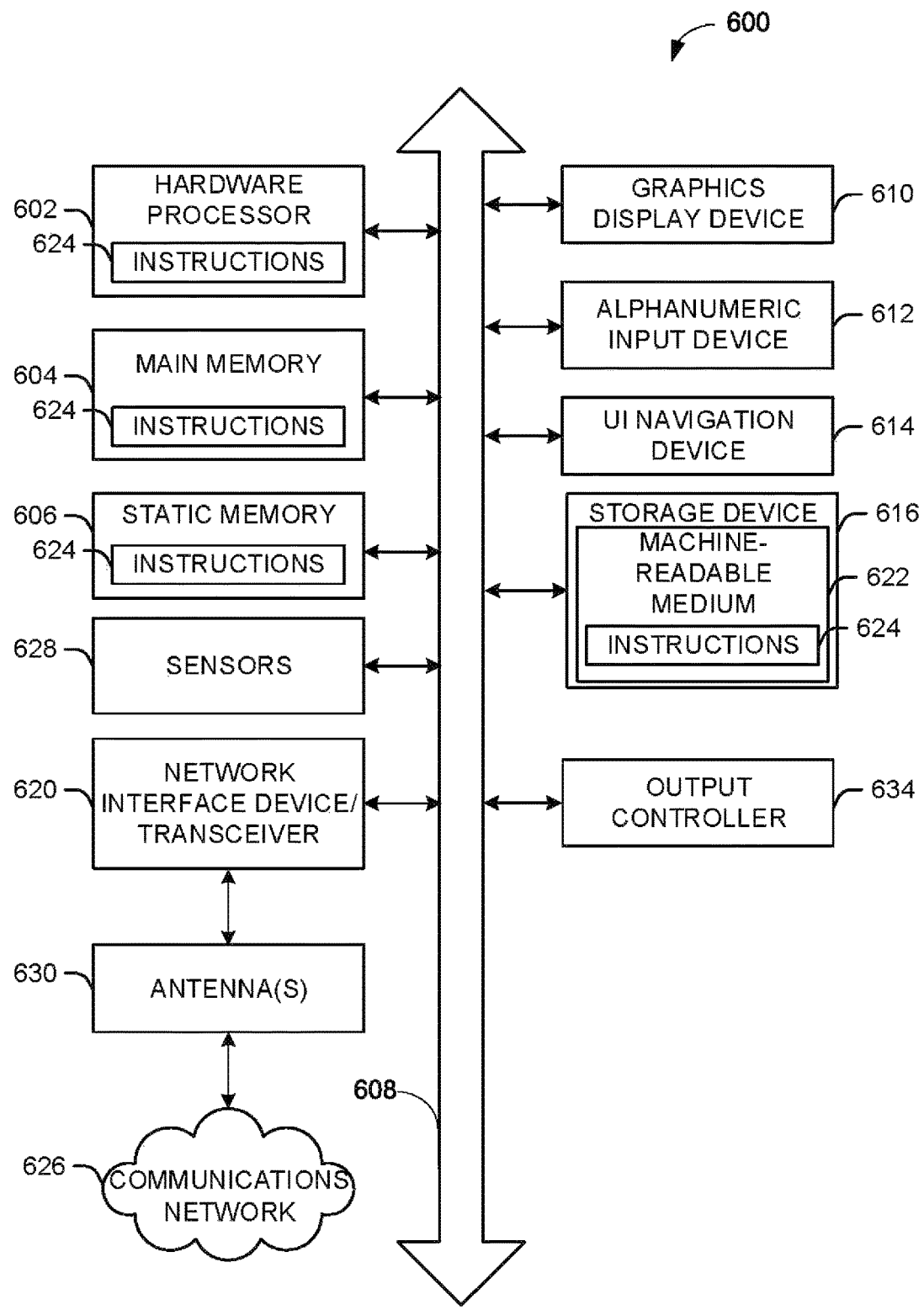
FIG. 6 illustrates an example of a computing system, in accordance with one or more embodiments of this disclosure.

In one or more embodiments, any of the one or more vehicles 502, one or more user devices 506, and/or one or more servers 508 and/or any other elements of the system 500 may include any of the components of the machine 600 described with respect to FIG. 6. That is, as illustrated in the figure, these elements of the system 500 may include one or more processor(s) and memory, as well as at least any other elements described as being included in the machine 1000. That is, although the figure may only depict a particular element of system 500 as having one or more processors, memory, and one or more modules, this may not be intended to be limiting in any way.

FIG. 6 depicts a block diagram of an example machine 600 upon which any of one or more techniques (e.g., methods) may be performed, in accordance with one or more example embodiments of the present disclosure. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A vehicle comprising:
 a processor; and
 a memory storing computer-executable instructions, that when executed by the processor, cause the processor to:
  receive one or more inputs, the one or more inputs including at least a starting location, a destination location, and a user identification;
  determine, at a first time and based on the user identification, that a user is associated with a first driving experience level;
  determine, based on the one or more inputs and the first driving experience level, a first difficulty value for a first route between the starting location and the destination location and a second difficulty value for a second route between the starting location and the destination location;
  determine that the first difficulty value is less than the second difficulty value; automatically update, prior to a first vehicle trip, a navigation system to the first route based on the determination that the first difficulty value is less than the second difficulty value;
  determine, at a second time, that the user is associated with a second driving experience level, wherein the second driving experience level is different than the first driving experience level;
  determine, based on the second driving experience level, a third difficultly value for the second route between the starting location and the destination location, wherein the third difficulty value is less than the first difficulty value; and
  automatically update, prior to a second vehicle trip, a navigation system to the second route based on the determination that the third difficulty value is less than the first difficulty value.

2. The vehicle of claim 1, wherein the computer-executable instructions further cause the processor to:
 capture, while the vehicle is navigating the first route in real-time, first data associated with navigation of the first route; and
 automatically update, prior to the second vehicle trip that is subsequent to the first vehicle trip, the navigation system to the second route instead of the first route based on the first data and/or second data received from the user.

3. The vehicle of claim 2, wherein automatically updating the navigation system to the first route prior to the first vehicle trip is performed based on a machine learning system, wherein the machine learning system is trained using the first data and the second data to generate an updated machine learning system, and wherein automatically updating the navigation system to the second route prior to the second vehicle trip is performed based on the updated machine learning system, wherein determine that the user is associated with the second driving experience level is based on an increased amount of time on a road, sensor data indicating improved driving performance, and/or manual feedback from the user.

4. The vehicle of claim 1, wherein the computer-executable instructions further cause the processor to:
 present a listing including the first route, the second route, an indication of the first difficulty value, and an indication of the second difficulty value; and
 receive a selection of the first route.

5. The vehicle of claim 1, wherein the one or more inputs further comprise map information from the navigation system, real-time traffic information, and/or driver identification information.

6. The vehicle of claim 1, wherein the starting location, the destination location, and/or the first driving experience level are automatically determined based on historical data associated with the user.

7. The vehicle of claim 1, wherein the starting location and the destination location are received through a user interface of a human-machine interface (HMI) of the vehicle or a mobile device application, wherein the first route is presented through the user interface, wherein one or more markers are presented on the first route via the user interface, and wherein the one or more markers provide, based on a user selection, information about difficult portions of the first route.

8. A method comprising:
 receiving one or more inputs, the one or more inputs including at least a starting location, a destination location, and a user identification;
 determining, at a first time and based on the user identification, that a user is associated with a first driving experience level;
 determining, based on the one or more inputs and the first driving experience level, a first difficulty value for a first route between the starting location and the destination location and a second difficulty value for a second route between the starting location and the destination location;
 determining that the first difficulty value is less than the second difficulty value;
 automatically updating, prior to a first vehicle trip, a navigation system to the first route based on the determination that the first difficulty value is less than the second difficulty value;
 determining, at a second time, that the user is associated with a second driving experience level, wherein the second driving experience level is different than the first driving experience level;
 determining, based on the second driving experience level, a third difficultly value for the second route between the starting location and the destination location, wherein the third difficulty value is less than the first difficulty value; and
 automatically updating, prior to a second vehicle trip, a navigation system to the second route based on the determination that the third difficulty value is less than the first difficulty value.

9. The method of claim 8, further comprising:
 capturing, while the vehicle is navigating the first route in real-time, first data associated with navigation of the first route; and
 automatically updating, prior to the second vehicle trip that is subsequent to the first vehicle trip, the navigation system to the second route instead of the first route based on the first data and/or second data received from the user.

10. The method of claim 9, wherein automatically updating the navigation system to the first route prior to the first vehicle trip is performed based on a machine learning system, wherein the machine learning system is trained using the first data and the second data to generate an updated machine learning system, and wherein automatically updating the navigation system to the second route prior to the second vehicle trip is performed based on the updated machine learning system.

11. The method of claim 8, further comprising:
presenting a listing including the first route, the second route, an indication of the first difficulty value, and an indication of the second difficulty value; and
receiving a selection of the first route.

12. The method of claim 8, wherein the one or more inputs further comprise map information from the navigation system, real-time traffic information, and/or driver identification information.

13. The method of claim 8, wherein the starting location, the destination location, and/or the first driving experience level are automatically determined based on historical data associated with the user.

14. The method of claim 8, wherein the starting location and the destination location are received through a human-machine interface (HMI) of the vehicle or a mobile device application user interface, and wherein the first route is presented through the HMI or the mobile device application user interface.

15. A non-transitory computer-readable medium storing computer-executable instructions, that when executed by a processor, cause the processor to perform operations of:
receiving one or more inputs, the one or more inputs including at least a starting location, a destination location, and a user identification;
determining, at a first time and based on the user identification, that a user is associated with a first driving experience level;
determining, based on the one or more inputs and the first driving experience level, a first difficultly difficulty value for a first route between the starting location and the destination location and a second difficulty value for a second route between the starting location and the destination location;
determining that the first difficulty value is less than the second difficulty value;
automatically updating, prior to a first vehicle trip, a navigation system to the first route based on the determination that the first difficulty value is less than the second difficulty value;
determining, at a second time, that the user is associated with a second driving experience level, wherein the second driving experience level is different than the first driving experience level;
determining, based on the second driving experience level, a third difficultly value for the second route between the starting location and the destination location, wherein the third difficulty value is less than the first difficulty value; and
automatically updating, prior to a second vehicle trip, a navigation system to the second route based on the determination that the third difficulty value is less than the first difficulty value.

16. The non-transitory computer-readable medium of claim 15, wherein the computer-executable instructions further cause the processor to perform operations of:
capturing, while the vehicle is navigating the first route in real-time, first data associated with navigation of the first route; and
automatically updating, prior to the second vehicle trip that is subsequent to the first vehicle trip, the navigation system to the second route instead of the first route based on the first data and/or second data received from the user.

17. The non-transitory computer-readable medium of claim 16, wherein automatically updating the navigation system to the first route prior to the first vehicle trip is performed based on a machine learning system, wherein the machine learning system is trained using the first data and the second data to generate an updated machine learning system, and wherein automatically updating the navigation system to the second route prior to the second vehicle trip is performed based on the updated machine learning system.

18. The non-transitory computer-readable medium of claim 15, wherein the computer-executable instructions further cause the processor to perform operations of:
presenting a listing including the first route, the second route, an indication of the first difficulty value, and an indication of the second difficulty value; and
receiving a selection of the first route.

19. The non-transitory computer-readable medium of claim 15, wherein the one or more inputs further comprise map information from the navigation system, real-time traffic information, and/or driver identification information.

20. The non-transitory computer-readable medium of claim 15, wherein the starting location, the destination location, and/or the first driving experience level are automatically determined based on historical data associated with the user.

* * * * *